United States Patent [19]

Okumura

[11] Patent Number: 4,674,048

[45] Date of Patent: Jun. 16, 1987

[54] MULTIPLE ROBOT CONTROL SYSTEM USING GRID COORDINATE SYSTEM FOR TRACKING AND COMPLETING TRAVEL OVER A MAPPED REGION CONTAINING OBSTRUCTIONS

[75] Inventor: Katsuji Okumura, Chofu, Japan

[73] Assignee: Automax Kabushiki-Kaisha, Tokyo, Japan

[21] Appl. No.: 567,978

[22] Filed: Jan. 4, 1984

[30] Foreign Application Priority Data

Oct. 26, 1983 [JP] Japan .................. 58-200360
Oct. 27, 1983 [JP] Japan .................. 58-201652

[51] Int. Cl.[4] .................. G05B 19/42; G06F 15/50
[52] U.S. Cl. .................. 364/424; 318/568; 318/587; 901/1
[58] Field of Search .......... 364/424, 444, 461, 513; 180/168; 15/49 C; 446/442; 318/587, 568; 901/1

[56] References Cited

U.S. PATENT DOCUMENTS

| | | | |
|---|---|---|---|
| 3,713,505 | 1/1973 | Muller | 180/79.1 |
| 3,715,572 | 2/1973 | Bennett | 318/587 X |
| 3,750,833 | 8/1973 | Kahl | 180/79.1 |
| 4,108,269 | 8/1978 | Nakao | 180/168 |
| 4,119,900 | 10/1978 | Kremnitz | 318/587 |
| 4,486,694 | 12/1984 | Ohba et al. | 318/587 |
| 4,500,970 | 2/1985 | Daemmer | 364/513 |
| 4,600,999 | 7/1986 | Ito et al. | 364/513 |

FOREIGN PATENT DOCUMENTS 2526181 4/1983 France .

OTHER PUBLICATIONS

European Patent Search Report, document No. 142594 published May 29, 1985 based on application No. 84100065.

Primary Examiner—Jerry Smith
Assistant Examiner—Clark A. Jablon
Attorney, Agent, or Firm—Jordan and Hamburg

[57] ABSTRACT

A control system for a mobile robot calculates the instantaneous position of the robot, and sequentially stores data representative of the respective robot positions. The system studies and stores a range which the robot is to travel, and calculates a running pattern of the robot in the specific range. The robot is allowed to travel within the range without leaving any region untravelled in spite of the presence of obstructions which alters its path, while checking its own position. Also, the robot compensates for dislocations caused by slippage of its drive wheels or errors in the operation of its motors.

2 Claims, 9 Drawing Figures

4,674,048

MULTIPLE ROBOT CONTROL SYSTEM USING GRID COORDINATE SYSTEM FOR TRACKING AND COMPLETING TRAVEL OVER A MAPPED REGION CONTAINING OBSTRUCTIONS

BACKGROUND OF THE INVENTION

The present invention relates to a control system for an unmanned, mobile robot which has drive wheels to be capable of automatically travelling along a predetermined path.

A mobile robot designed for unmanned movement is sometimes used for cleaning the floors of buildings. Such a robot may be equipped with a vacuum cleaner and/or sweepers to clean a range of a floor which it travels. Prior art system proposed for controlling the travel of the mobile robot includes one which lays guide cables along a predetermined path of travel of the robot so as to generate an electromagnetic wave. The robot will be guided by the cables while sensing the magnetic field by means of a sensor. Another prior art control system uses optical marks or tapes which are located along the path of travel so that the robot may follow the path sensing the marks or tapes.

The prior art control systems described so far commonly achieve unmanned robot movement along a predetermined pattern by means of guide means in one form or another. A problem encountered with such guide means type systems is that troublesome work is required for setting and changing a running pattern. Another problem is that the installation of such guide means on floors is undesirable for some kind of buildings. Additionally, where an obstruction is positioned in a predetermined path, the robot cannot travel any further unless it is removed.

Also known in the art is a control system which loads an operation control circuitry of a mobile robot with a program, so that the robot may be automatically steered based on the program. This suffers from the drawback that the program has to be changed every time the dimensions and configuration of the floor to be swept are changed. Generally, various equipments and fixtures are arranged in a room of a building which constitute obstructions to the travel of the robot. Therefore, the program has to be designed in due consideration of such obstructions resulting in prohibitive amounts of time and labor required therefor.

Furthermore, all the prior art control systems described above share a disadvantage that they lack a function which allows a robot to judge the surrounding conditions and, therefore, the robot cannot take an adequate measure against a change occurring therein.

SUMMARY OF THE INVENTION

It is therefore an object of the present invention to provide a control system for a mobile robot which makes it possible for the robot to study and store a range which it is to move, and, during a travel, employs its own decision while determining a travel pattern in the specific range in response to varying conditions.

It is another object of the present invention to provide a control system for a mobile robot which allows the robot to travel in a range assigned thereto without hitting against possible obstructions and throughly in the rest of the specific range.

It is another object of the present invention to provide a generally improved control system for a mobile robot.

A control system for a mobile robot of the present invention causes the robot to automatically run along a predetermined path and in a selected direction at a selected speed by controlling rotations of right and left wheels thereof independently of each other. The control system comprises position identification means for sensing a distance travelled by the robot and a change in a direction of travel of the robot, calculating a position of the robot in two-dimensional coordinates in response to the sensed distance and the sensed change in direction, and generating a position signal representative of the robot position. Obstruction sensor means senses an obstruction to generate an obstruction signal. The obstruction sensor means are mounted on a front end and both sides of the robot with respect to an intended direction of travel of the robot. Storage means stores a map consisting of a number of unit blocks which are defined by parallel columns and parallel rows in the two-dimensional coordinates. Teaching means causes the robot to make a round along a boundary of a range to be travelled by the robot, so that the range is stored in the map of the storage means in response to the position signal output from the position identification means. First operation means causes the robot to sequentially move back and forth along one of the columns and rows of the map in the range stored in the map, while sequentially shifting the robot to one of the subsequent columns and rows. Second operation means shifts the robot to one of the next column and the next row in response to detection of an obstruction by turning the robot at a position where the obstruction is sensed. Non-travelled region discriminating means discriminates a non-travelled region by reading out a travelled region out of the storage means and comparing the travelled region with the range to be travelled. Third operation means returns the robot to a non-travelled region to cause the robot to resume reciprocation when the non-travelled region is present on an extension of a travelled column, at one of an instant when an obstruction ahead the robot disappears and an instant when the travel of the robot in the range to be travelled is completed. End-of-travel discriminating means discriminates completion of the travel when a non-travelled region is eliminated in the range to be travelled except for an obstruction.

The above and other objects, features and advantages of the present invention will become apparent from the following detailed description taken with the accompanying drawing.

DESCRIPTION OF THE PREFERRED EMBODIMENT

While the control system for a mobile robot of the present invention is susceptible of numerous physical embodiments, depending upon the environment and requirements of use, a substantial number of the herein shown and described embodiment have been made, tested and used, and all have performed in an eminently satisfactory manner.

Figure 1:
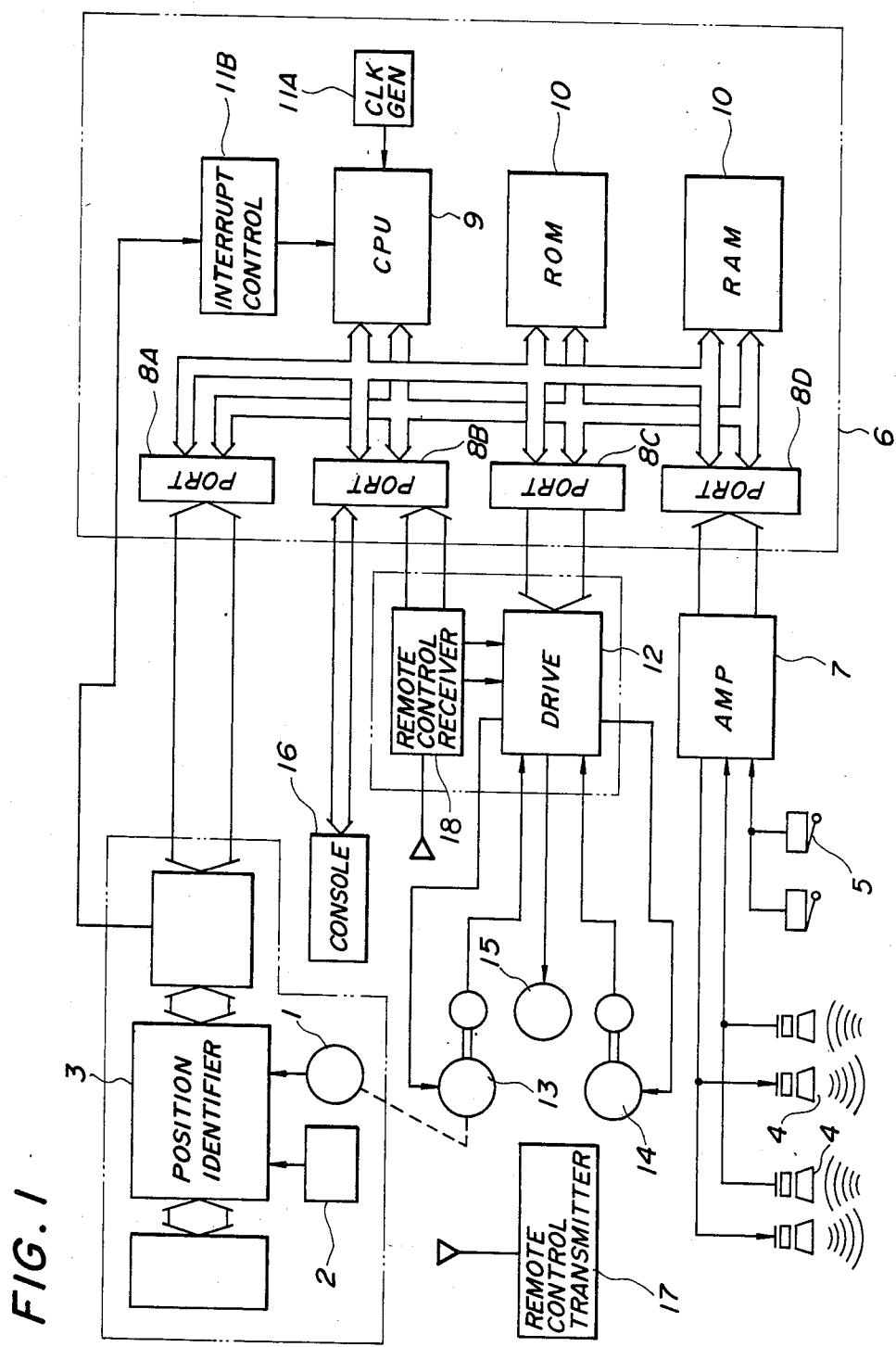
FIG. 1 is a block diagram of a robot control system embodying the present invention.

Referring to FIG. 1 of the drawing, a distance sensor 1 for producing a pulse signal which is proportional to a distance travelled by the mobile robot, e.g. number of rotations of drive wheels. A direction sensor 2, such as a gas rate gyro, is sensitive to a change in the travelling direction of the robot. The pulse signal output from the distance sensor 1 and the output of the direction sensor are supplied to position identification means 3. The position identification means 3 is constructed to measure a distance travelled by the robot by counting incoming pulses from the distance sensor 1 and to identify a moving direction of the robot from the output of the direction sensor 2, thereby identifying by operation instantaneous positions of the robot in two-dimensional coordinates for each unit travel distance. Obstruction sensors 4 are mounted on the front, opposite sides and back of the robot with respect to a direction of movement of the robot. Each of the obstruction sensors 4 is adapted to sense a wall, column or like obstruction and a distance to the obstruction by emitting a supersonic wave and receiving the reflection. Also mounted on the robot are touch sensors 5 which locate obstructions by mechanical contact therewith, independently of the obstruction sensors 4. The outputs of the sensors 4 and 5 are routed via an amplifier 7 and an input/output (I/O) port 8D to a control circuit 6, which comprises a microprocessor. Also, the output of the position identification means 3 is applied to the control circuit 6 via an I/O port 8A.

The control circuit 6 comprises a central operational circuitry (CPU) 9, and a storage 10 made up of a read only memory (ROM) and a random access memory (RAM). The control circuit 6 further comprises an oscillator 11A for generating clock pulses, and an interrupt controller 11B. As will be described, the CPU 9 delivers a drive signal to a drive circuit 12 via an I/O port 8C in order to reversibly control the rotation of drive motors (servo motors or stepping motors) 13 and 14, which are respectively associated with right and left drive wheels of the robot. At the same time, the control 6 controls the rotation of a drive motor 15 for cleaning sweepers which are mounted on the robot. A control console 16 is accessible for selectively turning on and off a system power source, switching a running mode, setting a start position, adjusting a sensitivity of the direction sensor 2, etc. In order to teach the robot a boundary of a travel range assigned thereto, a command may be applied to the drive 12 by interruption with priority on a radio control basis. This is effected by a remotecontrol transmit unit 17 and a receive unit 18. The outputs of the control console 16 and remotecontrol receive unit 18 are routed also to the control circuit 6 via an I/O port 8B.

Figure 2:
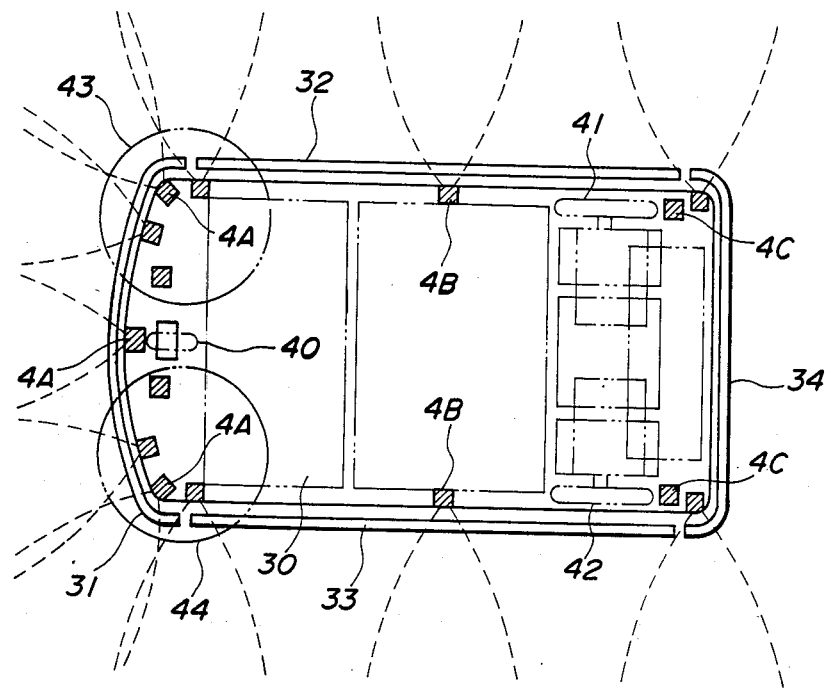
FIG. 2 is a schematic plan view of a robot body in accordance with the present invention.

Referring to FIG. 2, a practical construction of the mobile robot is shown in a schematic plan view. As shown, the robot comprises a body 30 which is substantially entirely surrounded by a front bumper 31, side bumpers 32 and 33, and a rear bumper 34, each carrying the touch sensor 5 therewith. An obstruction is sensed by the contact of any one of the bumpers 31-34 therewith. The obstruction sensors 4 comprise, in FIG. 2, supersonic wave sensors 4A mounted in the central and opposite corners of the front end of the robot body 30, supersonic wave sensors 4B on opposite sides, and supersonic wave sensors 4C at opposite corners of the rear end. All the supersonic wave sensors 4A, 4B and 4C operate in the manner previously described.

Usually, the supersonic wave sensors 4A and 4C are capable of sensing obstructions before the touch sensors 5 come into contact therewith. When obstructions exist in the dead angles of the sensors 4A and 4C due to an orientation of the robot, the touch sensors 5 will sense them only if the bumpers 31-34 lightly touch them. In this particular embodiment, the robot body 30 is freely movable on a floor by means of a front wheel 40 and a pair of rear wheels 41 and 42, which are the drive wheels. While the robot travels on a floor, two rotary sweepers 43 and 44 mounted on the front underside of the body 30 clean the floor.

In conjunction with a robot having the above construction, characteristic part of the present invention will be further described with reference to FIGS. 3 and 4.

Figure 3:
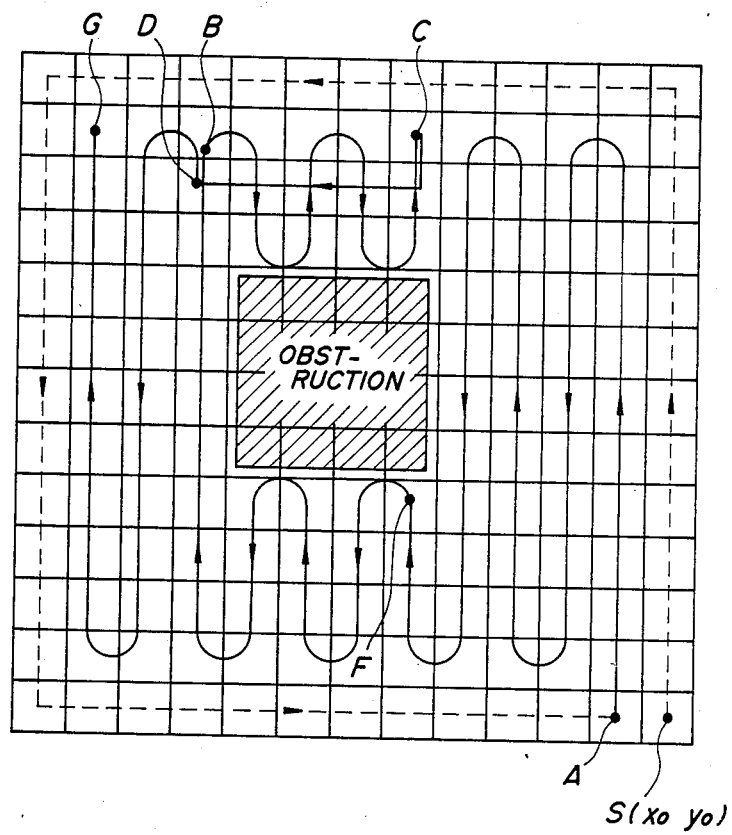
FIG. 3 is a diagram showing a first example of running patterns of the robot in accordance with the present invention.
Figure 4:
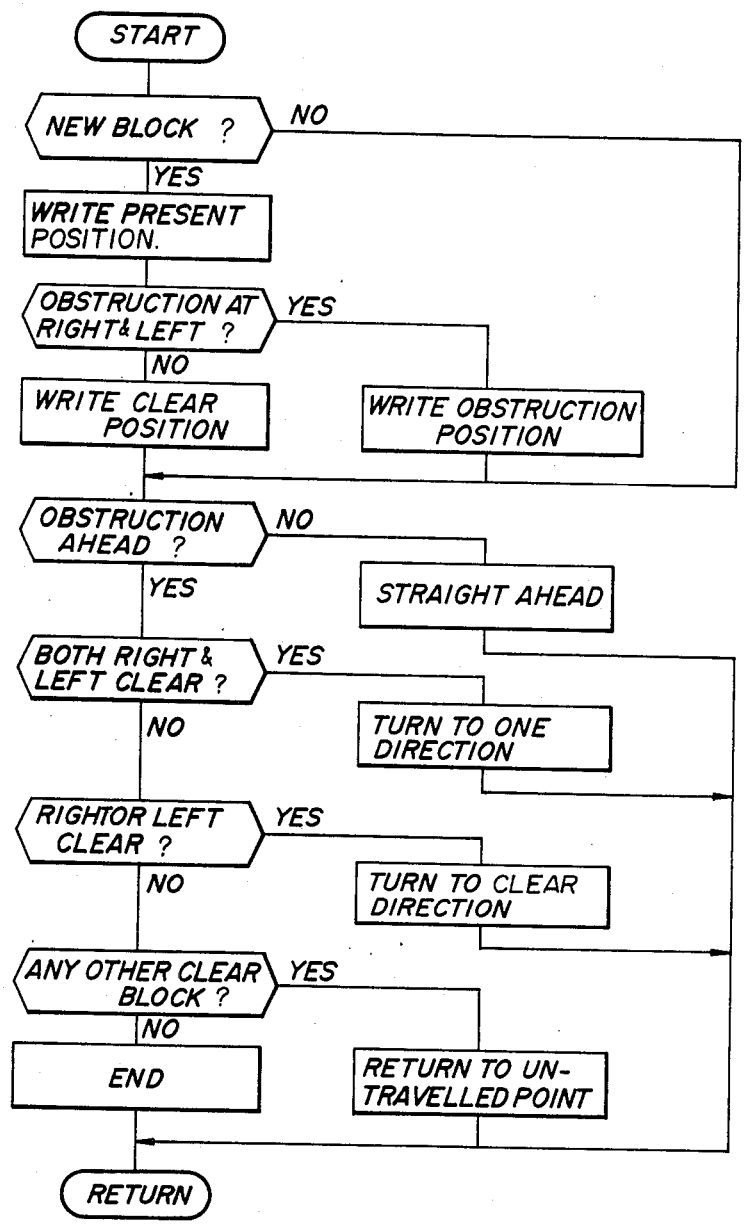
FIG. 4 is a flowchart demonstrating a control for effecting the run shown in FIG. 3.

Assume a range shown in FIG. 3 which the robot is to sweep. First, the control console 16 of the robot is manipulated to set up a teaching mode and, then, the robot is led to a start position (S) shown in FIG. 3 by use of the remotecontrol transmit unit 17 and receive unit 18. At the start position, a set button in the control console 16 is depressed to set a start point $(x_0, y_0)$ in the two-dimensional coordinates and a reference $\theta_0$ of travelling directions.

As the teaching for the robot along a predetermined course is started as indicated by a dotted line in FIG. 3 by means of the transmit unit 17 and receive unit 18, the CPU 9 of the control circuit 6 sequentially stores in the storage 10 instantaneous positions $(x, y)$ and travelling directions $\theta$ of the robot which are supplied thereto from the position identification means 3, whereby the robot studies the boundary of the expected range of movement. After the travel of the robot along the teaching course, the boundary is stored in a map in the two-dimensional coordinates and in the form of blocks which are divided at each unit distance along the x- and y-axes. Next, the robot is brought to the start point or to a point A adjacent to the start point and, then, the control console 16 is operated to switch the operation mode from the teaching mode to an unmanned running mode. This causes the control circuit 6 to deliver a drive signal to the drive 12 so that the robot begins an automatic run.

The automatic run of the robot is effected as follows controlled by the CPU 9.

Initially, the robot advances straight ahead over the blocks in a column which extends along the y-axis in the map. At this instant, the blocks which the robot has travelled are sequentially stored in the storage 10. As soon as the robot reaches the boundary which is identified by the position identification means 3, it is turned leftwardly from that position toward a non-travelled column of blocks (extending along the y-axis). While the robot moves the new column of blocks, the supersonic wave sensors 4B on the sides of the robot continuously watch the neighborhood to see if any obstruction is present at the right or left of the running column. If any obstruction is present, it is stored in the storage 10 and, if not, the blocks are stored as clear blocks in the storage 10. The straight run is sequentially repeated thereafter so that the travelled blocks increase in number one column at a time and, at the same time, the clear blocks stored in the storage 10 are successively erased. When the sensor 4A at the front end of the robot senses an obstruction ahead at a point F, the robot is turned toward the next non-travelled column of blocks as when the boundary is identified. Simultaneously, the block in which the sensor 4A has sensed the obstruction is stored in the storage 10.

In the manner described, the robot moves back and forth between the obstruction and the boundary while sensing the obstruction and without hitting thereagainst. When the robot comes to find no obstruction ahead, it drives forward along the column until the boundary is identified. As soon as the robot runs past the adjacent wall of the obstruction, it finds clear blocks at opposite sides thereof. This time, the robot is caused to turn in the opposite direction after reaching the boundary, thereby running in a non-travelled region of the floor at the rear of the obstruction. The point B at which the robot has turned this time is stored in the storage 10 in preparation for a return to the original position as will be described. The robot sequentially sweeps the non-travelled region in the manner described, repeatedly turning in the direction of the columns. At a point C, the robot identifies that a travelled block is present in the direction of the next turn. Then, the robot decides that it has fully covered the non-travelled region, returns straight to the point B along the transverse train or row of blocks, and then starts another run along the columns from a point D which is in a block next to the block B.

When the robot reaches a point G after the procedure described above, it ends the movement determining that no region in the taught range of movement is left unswept. To see if any range is left unswept, the robot compares the travelled region and the obstruction region stored in the storage 10. The robot may be programmed to move to the unswept area after completing the travel throughout the region inside the boundary. In any case, the sweepers 43 and 44 are rotated during the travel of the robot to effectively clean all over the predetermined range of the floor.

Figure 5:
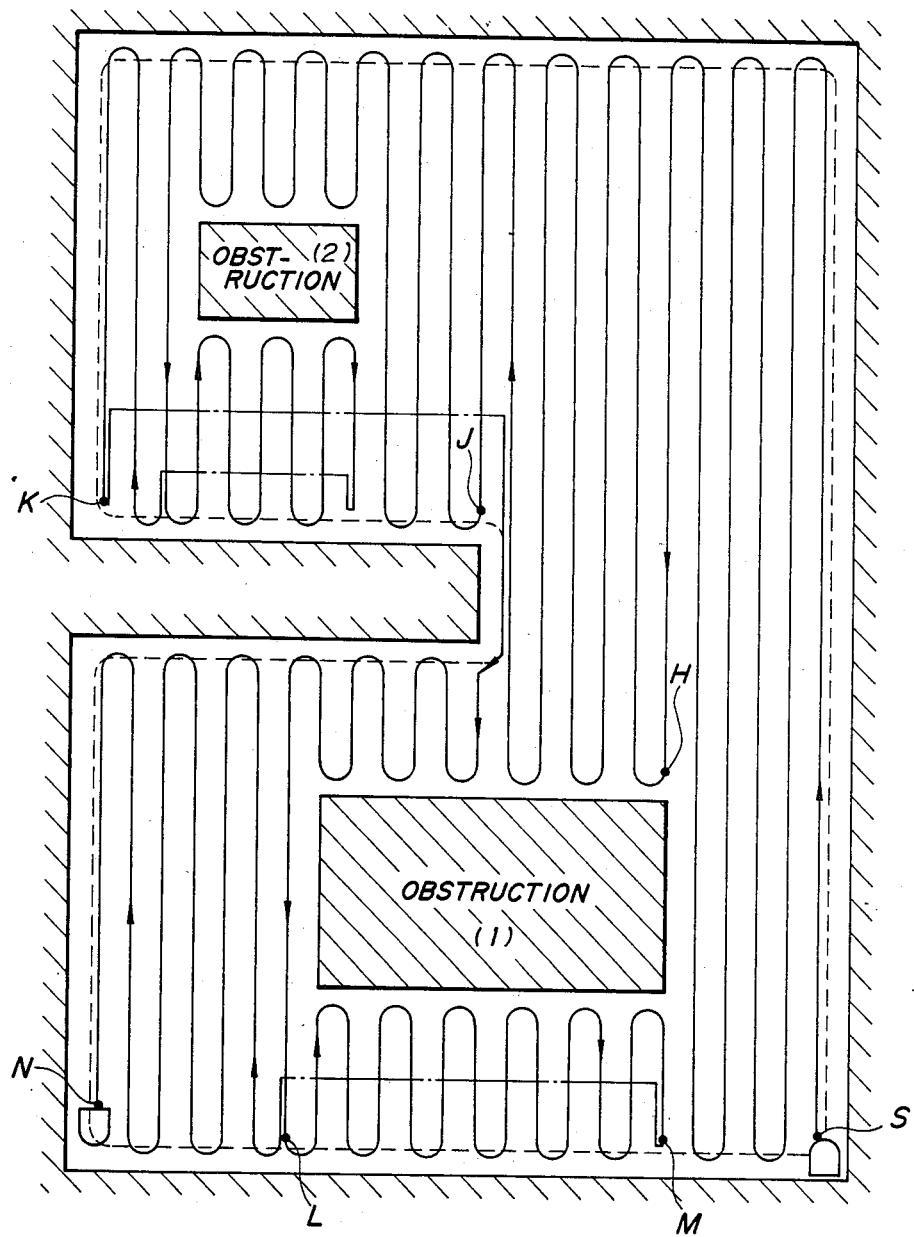
FIG. 5 is a diagram showing a second example of the robot running patterns.
Figure 6:
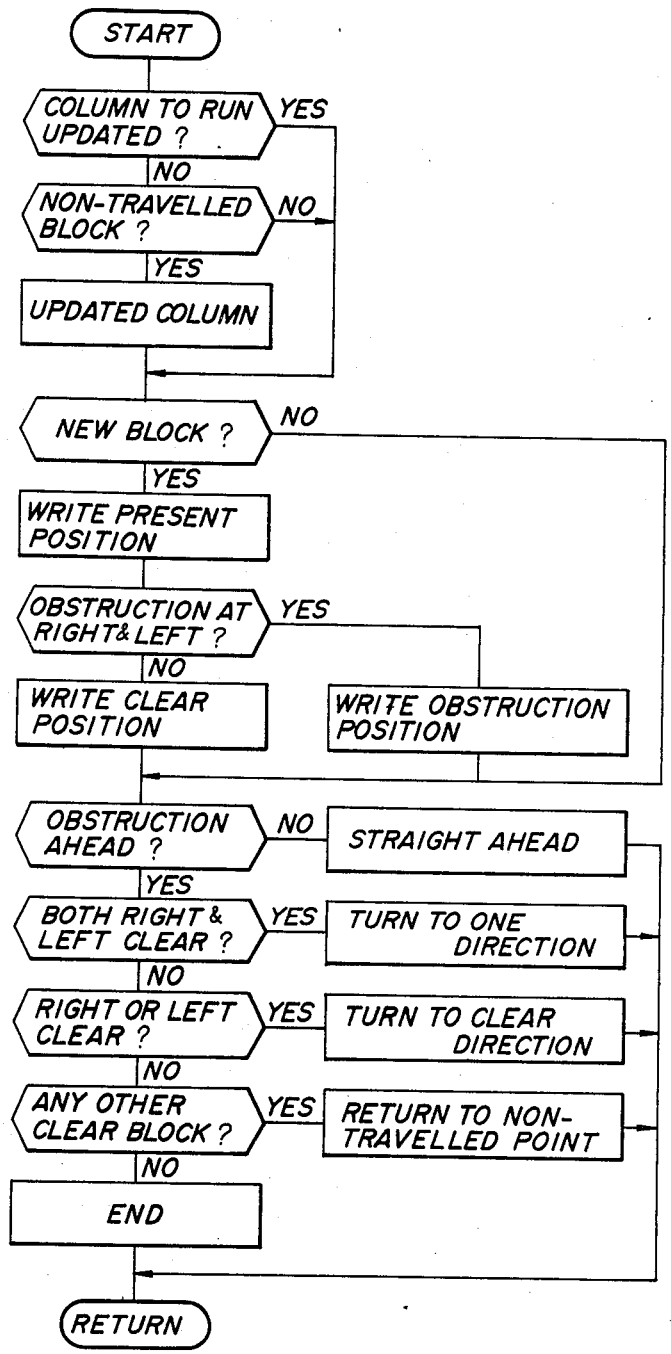
FIG. 6 is a flowchart demonstrating a control for effecting the run shown in FIG. 5.

The operation of the robot control system in accordance with the present invention will be further discussed in conjunction with the pattern shown in FIG. 5. The operation for the alternative sweeping pattern starts with teaching the robot a predetermined range of travel (surrounded by a dotted line in FIG. 5). Thereafter, the robot is returned to a start point S to begin an automatic run. While repeating reciprocal movement in the manner described, the robot senses a first obstruction (1) at a point H so that it sequentially shifts to the following columns turning at the point H. As the robot further advances column by column until sensing a projecting wall as illustrated, it stores the specific column at a point J and then repeatedly moves back and forth along the successive columns. After sensing a second obstruction (2), the robot runs back and forth down to a point K avoiding the obstruction (2), as has been the case with the pattern shown in FIG. 3. From the point K, the robot returns to the point J in the stored specific column traversing the swept columns. At the point J, the robot is redirected to follow the boundary of the predetermined range. As soon as the robot clears the protruding wall, it steers itself into a column which is the extension of the column with the point J, and then resumes a straight travel. At this instant, the robot advances into a new non-travelled area updating (clearing) the stored column. At a point L, the robot enters an area at the back of the obstruction (1) which has been left unswept. Thereafter, the robot shifts from a point M back to the point L across the swept columns so as to start a reciprocal movement again. At a point N, the robot completes the whole movement determining that it has throughly swept the taught range of movement.

Figure 7:
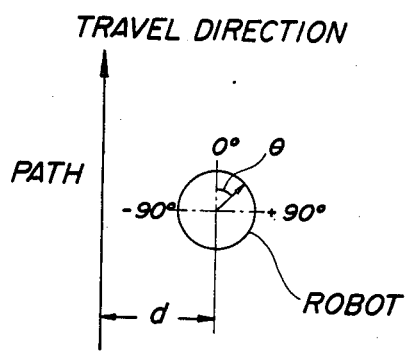
FIG. 7 is a diagram explanatory of a deviation of the robot from a predetermined straight path.

Now, while automatically running in the manner described, the robot may become dislocated from a predetermined or reference path as shown in FIG. 7 due to slippage of the drive wheels 41 and 42, errors in the operation of the motors 13 and 14, etc. In accordance with the present invention, the deviation of the actual path of travel from the reference path is compensated for by the following control.

Figure 8:
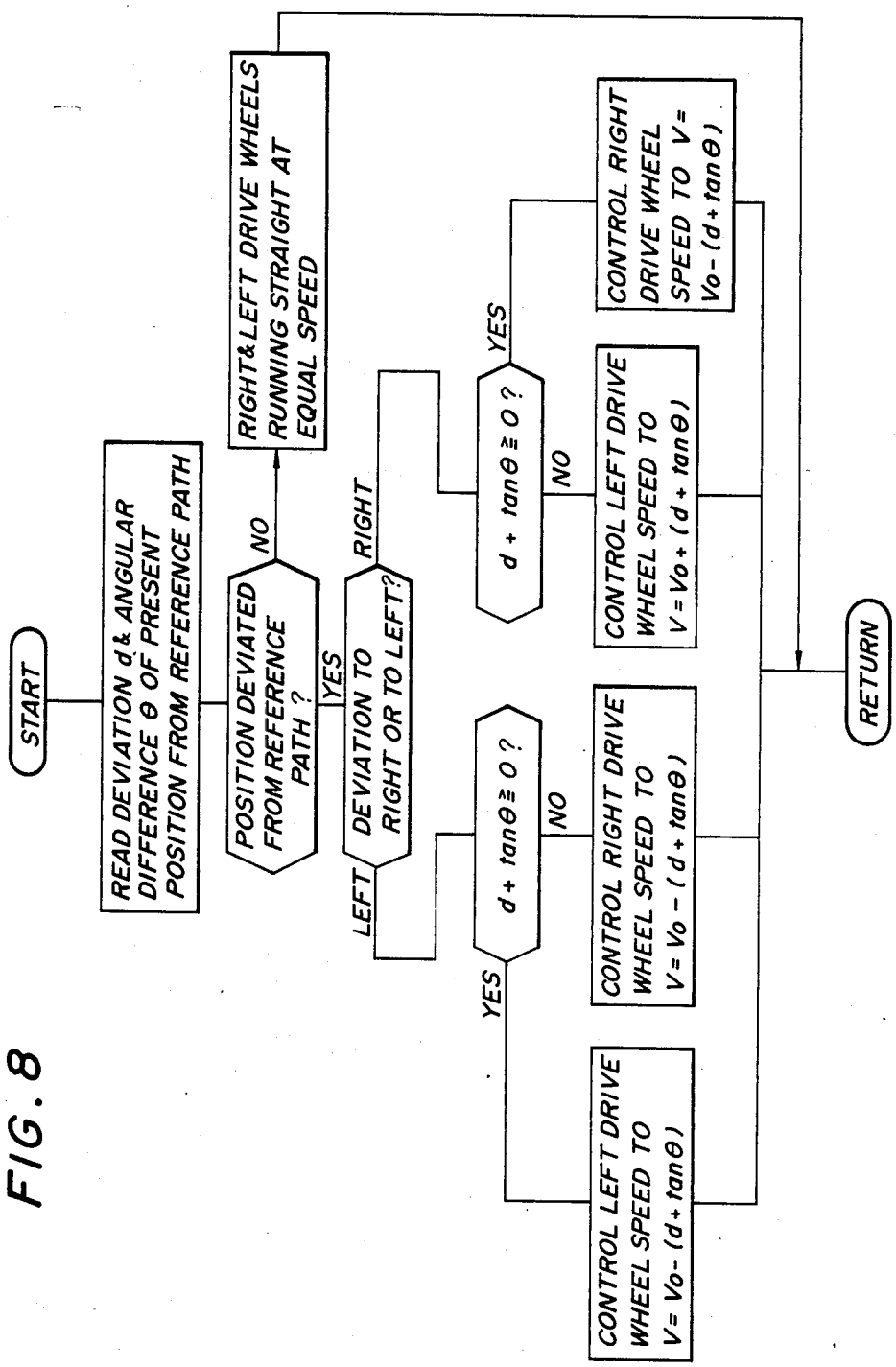
FIG. 8 is a flowchart representing a control for compensating for the deviation shown in FIG. 7.

A routine for the control is shown in FIG. 8 and will hereinafter be discussed with reference to FIG. 7 as well.

As shown in FIG. 7, assume that the robot is deviated to the right from the reference path by a distance d with respect to the travelling direction of the robot, and that it is misoriented by an angle $\theta$ relative to the reference path. Then, that the deviation of the robot is to the right of the reference path is determined. Also, whether the sign of $d + \tan \theta$ is positive or negative is determined by operation. Let it be assumed that $d + \tan \theta$ is either $d + \tan \theta \geq 0$ or $d + \tan + < 0$.

In the first-mentioned condition, $d + \tan \theta \geq 0$, the distance d is large, or the angle $\theta$ is relatively small, or the orientation of the robot lies in the positive angular range. Then, the rotation speed V of the left drive wheel is controlled to be $V = V_0 - (d + \tan \theta)$ (where the minimum value of V is assumed to be $V_0$), while the rotation speed of the right drive wheel is kept at $V_0$, whereby the robot is caused to make a leftward turn or rotate leftwardly about an axis thereof.

The other condition, $d + \tan \theta < 0$ represents a situation in which the angle $\theta$ is negative and the robot is directed toward the path at a large angle. In this case, while the rotation of the left drive wheel is maintained the same, the rotation speed V of the right drive wheel is controlled to be $V = V_0 + (d + \tan \theta)$, thereby turning or rotating the robot to the right.

In this manner, the actual path of the robot is controlled to the reference path if dislocated therefrom, that is, the position of the robot is corrected.

The compensation effected for rightward deviation of the actual robot path from the reference path as described similarly applied to leftward deviation of the robot, except for the reversal of angles and that of the control over the right and left drive wheels.

Due to the use of a tan function as a compensation term for the angle $\theta$, so long as MAX in the relation $-\text{MAX} < \tan \theta < \text{MAX}$ is sufficiently large, there exist a position and an angle where $d + \tan \theta = 0$ holds, even if the deviation d from the path is substantial. At such a specific point, the right and left drive wheels of the robot are equal in velocity and they approach the path at an angle to the path which becomes closer to the right angle as the distance d increases and decreases with the decrease in the distance d. Stated another way, the orientation of the robot is compensated sharply when the distance d is large and the compensation is slowed down as the distance d becomes smaller. This insures smooth compensation of the orientation of the robot without hunting or the like due to excessive controls during the compensation. If desired, the term d may be multiplied by a positive constant $\alpha$ and the term tan $\theta$ by a positive constant $\beta$ so that any desired path compensation characteristic is established up to the point where $\alpha d + \beta \tan \theta = 0$ holds, that is, the point where the robot advances straight with the right and left drive wheels running at an equal speed.

Teaching the robot a desired range of movement may be implemented by the supersonic wave sensors 4A, 4B and 4C and the touch sensors 5 which are mounted on the robot itself, instead of the remotecontrol transmit and receive units. Some of the supersonic wave sensors 4A, 4B and 4C are capable of identifying short and medium ranges and the others, long ranges. Such self-teaching with the various sensors is optimum for cleaning, for example, the floor of a room which is surrounded by walls; the robot will make one round automatically along the walls of the room by sensing the walls with the sensors.

Figure 9:
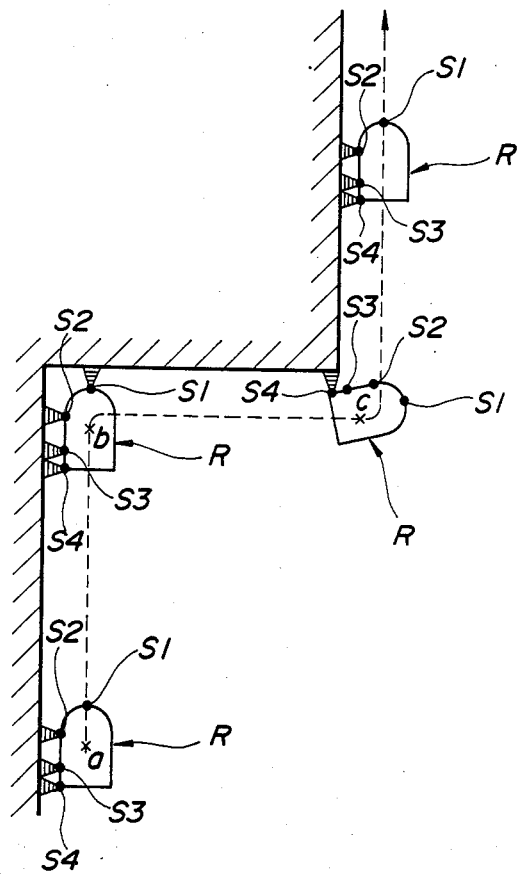
FIG. 9 is a diagram showing an example of a self-teaching travel of the robot.

An example of the travelling pattern along walls is shown in FIG. 9. During the straight travel from a point a to a point b, the robot is controlled on the basis of outputs of the medium range sensors $S_2$ and $S_3$. When the robot is too close to the wall, the rotation of the drive wheel remote from the wall is decelerated or stopped to correct the orientation of the robot away from the wall. As the outputs of the two medium range sensors $S_2$ and $S_3$ coincide with each other, the robot is allowed to run straight without any further compensation. If the robot is positioned too far from the wall, the output of either one of the medium range sensors $S_2$ and $S_3$ will disappear to cause the control circuit to decelerate or stop the movement of the drive wheel closer to the wall, thereby bringing the robot closer to the wall.

As the robot reaches the point b where the front sensor $S_1$ senses the wall ahead, it once stops its movement and then moves backward a predetermined distance. Then, the robot rotates clockwise as viewed in FIG. 9 over a predetermined angle $\theta$ (with the right drive wheel stopped and the left drive wheel rotated for a predetermined period of time), thereafter resuming the straight run. When the front sensor $S_1$ is turned on again, the above procedure is repeated to further rotate the robot so that, eventually, the robot attains a position parallel to the wall. Thereafter, the robot runs straight from the point b to the next point c.

As the robot moves past the point c, the medium range sensors $S_2$ and $S_3$ no longer sense the wall while only the long range sensor $S_4$ senses it. Hence, the robot is caused to rotate counterclockwise at that point as viewed in FIG. 9. As soon as the medium range sensors $S_2$ and $S_3$ come to sense the wall again, the robot is allowed to run a straight path along the wall.

While the robot in FIG. 9 is assumed to travel along walls which are commonly located to the left thereof with respect to the direction of travel, the same control applies to the case wherein the walls are located to the right of the robot, except for the reversal of the rotating directions of the robot.

Various modifications will become possible for those skilled in the art after receiving the teachings of the present disclosure without departing from the scope thereof.

What is claimed is:

1. A control system for a mobile robot for causing the robot to automatically run along a predetermined path, in a selected direction, and at a selected speed by controlling the rotation of right and left drive wheels thereof independently of each other, said control system comprising:

position identification means for sensing the distance travelled by the robot and the change in direction of travel of the robot, calculating the position of the robot in two-dimensional coordinates in response to the sensed distance and the sensed change in direction, and generating a position signal representative of said robot position;

storage means for storing a map consisting of a number of unit blocks which are defined by parallel columns and parallel rows in two-dimensional coordinates;

obstruction sensor means connected to said storage means for sensing an obstruction to generate an obstruction signal, said obstruction sensor means being mounted on a front end and both sides of the robot with respect to an intended direction of travel of the robot;

teaching means for causing the robot to move along the boundary of an area range to be travelled by the robot, so that said area range is stored in the map of the storage means in response to the position signal output from the position identification means;

first operation means connected to said position identification means and said storage means for causing the robot to sequentially move back and forth along the rows and columns by moving along the rows of one of the columns of the map in the area range stored in the map and sequentially shifting to the subsequent row of columns;

second operation means connected to said obstruction sensor means for shifting the robot to one of the next columns in response to detection of an obstruction by said obstruction sensor means by turning the robot at a position where the obstruction is sensed;

non-travelled region discriminating means connected to said storage means for discriminating an initial non-travelled region by reading out the actual travelled region out of the storage means and comparing the actual travelled region with said stored area range as determined by said teaching means;

third operation means connected to said second operation means and to said non-travelled region discriminating means for moving the robot to said initial non-travelled region to cause the robot to initially resume reciprocation along a beginning of said initial non-travelled region, whereby the obstruction sensor means again detects said obstruction such that the robot continues to move along said initial non-travelled region, excluding the area occupied by said obstruction, until said third operation means returns said robot to said beginning of said initial non-travelled region upon the path travelled by the robot reaching the end of said initial non-travelled region; and end-of-travel discriminating means connected to said storage means for discriminating completion of the travel of the robot after the initial non-travelled region has been travelled upon by the robot and the area range has been travelled upon by the robot except for the obstruction.

2. A control system as claimed in claim 1, further comprising:

deviation means for determining whether the robot is deviated to the right or to the left from the predetermined path, said deviation means comprising determining means for determining whether $d+\tan\theta$ is positive or negative where d is the deviation of the robot from the predetermined path and $\theta$ is the angular difference of the travelling direction of the robot from the direction of the predetermined path, and control means for controlling one of the right and left drive wheels to move at a rotation speed $V=V_O-(d+\tan\theta)$ when $d+\tan\theta \geq 0$ and the other of the right and left drive wheels when $d+\tan\theta < 0$, where $V_O$ is a reference rotation speed.

* * * * *